United States Patent
Ichinose et al.

(10) Patent No.: US 8,862,300 B2
(45) Date of Patent: Oct. 14, 2014

(54) PITCH CONTROL DEVICE FOR ELECTRIC VEHICLE

(75) Inventors: Masanori Ichinose, Tsukuba (JP);
Tomohiko Yasuda, Kashiwa (JP);
Takayuki Satou, Kashiwa (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 51 days.

(21) Appl. No.: 13/703,397

(22) PCT Filed: Jun. 10, 2011

(86) PCT No.: PCT/JP2011/063411
§ 371 (c)(1),
(2), (4) Date: Jan. 18, 2013

(87) PCT Pub. No.: WO2011/155612
PCT Pub. Date: Dec. 15, 2011

(65) Prior Publication Data
US 2013/0116874 A1 May 9, 2013

(30) Foreign Application Priority Data

Jun. 11, 2010 (JP) ................................ 2010-133502

(51) Int. Cl.
*B60W 30/02* (2012.01)
*B60W 10/18* (2012.01)
*B60L 15/20* (2006.01)
*B60W 10/08* (2006.01)
*B60L 7/18* (2006.01)

(52) U.S. Cl.
CPC ........... *B60W 30/02* (2013.01); *B60W 2520/16* (2013.01); *B60W 10/18* (2013.01); *B60L 15/20* (2013.01); *B60W 10/08* (2013.01); *B60L 7/18* (2013.01)
USPC .............................................. 701/22; 701/38

(58) Field of Classification Search
USPC ...................................................... 701/22, 38
See application file for complete search history.

(56) References Cited

U.S. PATENT DOCUMENTS

2011/0077835 A1* 3/2011 Otsuka ............................ 701/99

FOREIGN PATENT DOCUMENTS

| JP | 62-12305 | 1/1987 |
|---|---|---|
| JP | 9-130913 | 5/1997 |
| JP | 2001-30795 | 2/2001 |

(Continued)

*Primary Examiner* — Mary Cheung
*Assistant Examiner* — Yuen Wong
(74) *Attorney, Agent, or Firm* — Antonelli, Terry, Stout & Kraus, LLP.

(57) ABSTRACT

To suppress a change in a vehicle's attitude due to a pitch motion during vehicle braking, a pitch control device for an electric vehicle can prevent discontinuous negative acceleration from occurring at a moment of the vehicle stopping by appropriately controlling a braking force of the vehicle, thereby effectively controlling the pitch motion of the vehicle, and can enhance steering stability while ensuring riding comfort for passengers, even when traveling resistance significantly changes according to road surface gradient and when the vehicle weight significantly changes with increases/decreases in the number of drivers and in the quantity of goods loaded.
This pitch control device for an electric vehicle, configured to conduct pitch control for suppressing the change in the attitude of the vehicle due to the pitch motion of the electric vehicle, controls the vehicle so that a braking/driving torque command value that is output to a motor for driving the vehicle when the vehicle stops will be a traveling resistance equivalent torque that is a value obtained by converting a force needed to stop the vehicle on a sloped road surface and maintain the vehicle in a stopped condition, into a torque of the driving motor.

7 Claims, 4 Drawing Sheets

(56) References Cited

FOREIGN PATENT DOCUMENTS

| | | |
|---|---|---|
| JP | 2006-67790 | 3/2006 |
| JP | 2007-143350 | 6/2007 |
| JP | 2007-161032 | 6/2007 |
| JP | 2008-100579 | 5/2008 |
| JP | 2009-273274 | 11/2009 |

* cited by examiner

PITCH CONTROL DEVICE FOR ELECTRIC VEHICLE

TECHNICAL FIELD

The present invention relates generally to control devices for electric vehicles, and more specifically, to a technique for suppressing a pitch motion of a vehicle.

BACKGROUND ART

The movement of a vehicle's attitude is determined by the expansion and contraction of the suspensions used on and rear wheels of the vehicle, and the movement is called the pitch motion.

The movement of the vehicle's attitude, associated with the pitch motion, is known to change according to the particular traveling state of the vehicle or the particular state of the road surface.

For example, accelerating or decelerating the vehicle generates a moment about its center point of gravity, called the pitch moment, in the direction that a longitudinal axis of the vehicle body changes upward or downward.

The pitch moment causes the pitch motion.

In particular, when the vehicle is braked to stop, since a braking torque is continually applied to the vehicle until it has come to a stop, the pitch moment causes a 'nose dive', an event that the forepart of the vehicle goes down.

In addition, when the vehicle stops, negative acceleration due to the braking torque suddenly disappears, which then leads to the vehicle releasing a burst of energy which has been stored into the suspensions during the nose dive, and results in sway-back vibration due to the nose dive.

In order to suppress these changes in attitude, caused by the pitch motion and by the nose dive due to the pitch moment, vehicles are provided with dampers to attenuate the vibration stemming from springs of the suspensions.

The vehicle is adjustable in both riding comfort and steering stability by assigning appropriate damping characteristics to the springs and dampers in the suspension system, but it is very difficult to balance between riding comfort and steering stability.

This is because, since riding comfort and steering stability are contradictory characteristics and since the actual vehicle weight changes significantly with changes in actual carrying loads such as the number of passengers and the quantity of goods loaded, optimal data that allows response to all situations is difficult to determine.

Meanwhile, there is known such a technique, as disclosed in Patent Document 1 below, that is intended for complementing a suspension's functionality by controlling a driving force of the vehicle to stabilize an attitude of the vehicle body.

The technique described in Patent Document 1 suppresses the pitch motion of the vehicle appropriately according to a particular vertical position of its wheels. More specifically, if the wheels of the vehicle body move upward, the vehicle reduces the driving torque to reduce the moment applied in the direction that the wheels move upward by road-surface repulsion, and conversely if the wheels move downward, the vehicle increases the driving torque to increase the moment applied in the direction that the wheels move upward by road-surface repulsion.

RELATED ART LITERATURE

Patent Document

Patent Document 1: JP-1987-12305-A

SUMMARY OF THE INVENTION

Problems to be Solved by the Invention

The conventional technique disclosed in Patent Document 1, however, operates so that in order to suppress the pitch motion of the vehicle body, the driving torque of the vehicle is increased or reduced with a phase inverse to that of the pitch motion.

In other words, the conventional technique provides the control that reduces the negative acceleration of the vehicle or accelerates the vehicle to cancel the magnitude itself of the pitch motion due to a nose dive originally unavoidable during braking.

The control might excessively reduce the braking torque required for deceleration, and if this actually occurs, deterioration of vehicle controllability is likely, which may result in such an undesirable situation as of a braking distance being extended more than necessary.

In addition, on a sloped road surface, gravity changes the neutral position of the suspension that becomes a reference, and this change could render appropriate braking/driving torque control impossible and hence the pitch motion insuppressible.

Construction machines, in particular, significantly change in vehicle weight with changes in actual carrying loads such as the number of passengers and the quantity of goods loaded.

Optimal data relating to the braking/driving torque needs to be determined to prevent the deterioration of drivability due to braking/driving torque control, even under those changes, thus implementing the suppression of the pitch motion.

The present invention has been made with attention focused upon the above problems.

An object of the invention is to suppress changes in an attitude of a vehicle by appropriately controlling a pitch motion of the vehicle that may cause sway-back vibration if, at a moment of the vehicle stopping, negative acceleration due to a braking/driving torque suddenly disappears to bring the vehicle into a nose dive.

Another object of the invention is to provide a pitch control device for an electric vehicle, adapted to enhance steering stability while at the same time ensuring appropriate riding comfort for passengers, even in case of significant changes in traveling resistance due to a gradient of a road surface and in vehicle weight due to increases/decreases in the number of passengers or the quantity of goods loaded.

Means for Solving the Problems

A pitch control device for a vehicle is intended to conduct suppression control against the pitch motion caused by the sudden disappearance of the negative acceleration due to the vehicle's braking/driving torque immediately upon the vehicle stop. The device is also intended to control pitch while simultaneously ensuring the appropriate riding comfort for passengers, even when the road surface along which the vehicle is traveling changes in gradient with an elapse of the traveling time of the vehicle and if changes in the number of passengers or in the quantity of goods loaded cause a significant change in vehicle weight. The pitch control device for a vehicle is considered to take the following configuration.

The present invention relates particularly to a pitch control device for an electric vehicle.

The pitch control device for an electric vehicle, configured to conduct suppression control against changes in an attitude of the electric vehicle due to a pitch motion thereof, provides the control so that a braking/driving torque command value that is output to a driving motor for the electric vehicle when the vehicle is brought to a stop becomes a traveling resistance equivalent torque that is a value obtained by converting a force required for the vehicle to maintain the stopped condition with respect to a sloped road surface, into a torque of the driving motor.

The pitch control device of this configuration is characterized in that when the vehicle is brought to a stop, the braking/driving torque command value output to the driving motor for the electric vehicle becomes the traveling resistance equivalent torque.

The traveling resistance equivalent torque is the value obtained by converting the force required for the vehicle to maintain the stopped condition with respect to the sloped road surface, into the torque of the driving motor. While on the sloped road surface, the vehicle is always being subjected to resistance with respect to the road surface. For example, when the vehicle goes up a slope and then stops, the vehicle experiences a force that acts as if it were to pull the vehicle backward with respect to the upslope. Conversely, when the vehicle goes down a slope and then stops, the vehicle experiences a force that acts as if it were to move the vehicle forward with respect to the downslope. That is to say, when the vehicle stops, at least one of the two forces as mentioned above is always applied to the vehicle, such that the vehicle can be stopped by applying thereto a counteracting force balancing that force. The counteracting force as expressed in terms of the torque of the driving motor is the traveling resistance equivalent torque.

In order to ensure a reliable stop of the vehicle even on such a sloped road surface, the present invention controls pitch so that the braking/driving torque command value output to the driving motor during the vehicle stop will be the traveling resistance equivalent torque.

In addition, the braking/driving torque command value output to the driving motor during pitch control in the present invention is a braking/driving torque, which is calculated in accordance with a vehicle acceleration/deceleration request dictated by pedal operations of the driver, incorporating a correction so that the command value will be the traveling resistance equivalent torque obtained when the vehicle is brought to a stop.

Furthermore, the configuration of the pitch control device according to the present invention includes a drive unit that calculates the braking/driving torque based upon the vehicle acceleration/deceleration request dictated by the driver's pedal-operating quantities and outputs the calculated torque as the braking/driving torque command value to the driving motor. The device configuration also includes a torque correction value calculator that calculates an appropriate correction value for the braking/driving torque so that the braking/driving torque command value will be the traveling resistance equivalent torque that is a value obtained by converting a force needed to stop the vehicle on a sloped road surface and maintain the vehicle in a stopped condition, into a torque of the driving motor. The drive unit corrects the braking/driving torque in accordance with the torque correction value calculated by the torque correction value calculator, and outputs the corrected torque as the braking/driving torque command value to the driving motor.

An accelerator pedal and a brake pedal are connected to the drive unit, constituting an operating section that the driver uses to output the acceleration/deceleration request. The drive unit calculates the braking/driving torque based upon the driver's acceleration/deceleration request generated when the pedals are operated, and outputs the calculated torque as the braking/driving torque command value to the driving motor.

To control pitch so that when the vehicle stops, the braking/driving torque command value matches the traveling resistance equivalent torque, it is necessary to calculate the correction value appropriate for the braking/driving torque. The torque correction value calculator calculates the corrected value.

The torque correction value calculated by the torque correction value calculator is input to the drive unit, which then corrects the braking/driving torque that has been calculated in accordance with the driver's acceleration/deceleration request.

Furthermore, the traveling resistance equivalent torque can be determined from a difference between the braking/driving torque calculated in accordance with the acceleration/deceleration request dictated by the accelerator pedal and brake pedal operations of the driver, and a vehicle body inertia-equivalent torque calculated from a differentiated value of a speed of the electric vehicle.

The pitch control device for the electric vehicle starts the correction when an integral value of a total of the driving torque command value and the traveling resistance equivalent torque agrees with the speed of the electric vehicle. After that, the device outputs the corrected braking/driving torque as the braking/driving torque command value to the driving motor.

The torque correction value calculator has a correction function for calculating the torque correction value, and calculates the torque correction value in accordance with the correction function so that the braking/driving torque command value matches the traveling resistance equivalent torque occurring when the vehicle stops.

For example, if the correction function here is a linear function, the braking/driving torque is corrected linearly, that is, in accordance with the linear function so that the braking/driving torque command value matches the traveling resistance equivalent torque occurring when the vehicle stops.

The correction function is changed according to a particular change in the weight of the electric vehicle over time.

Electric vehicles suffer the change in vehicle weight with the number of passengers and the quantity of goods loaded. This change in weight causes a change in a natural frequency of the pitch motion, since an inertial moment of the vehicle body also changes. In this context, the change in weight is a crucial state quantity that is to be considered during pitch control.

Dump trucks and other materials-handling vehicles, in particular, are frequently loaded and unloaded, and the weights of electric vehicles are estimated to significantly change with time. If a change in the weight of an electric vehicle is incorporated into the correction function for the calculation of the torque correction value, this allows reliable and highly precise control insusceptible to any changes in a loaded state of the vehicle.

The correction function is also changed according to a particular change in magnitude of the traveling resistance equivalent torque over time.

When the electric vehicle travels, the road surface may be sloped, not flat, and the gradient of the road surface may change with a progress of traveling. If the change in gradient leads to a change in longitudinal weight distribution of the vehicle and the springs of the suspensions have a nonlinear shape, effective control of pitch becomes difficult to implement, since a change in the neutral position of the suspensions due to a shaft load change also causes a change in spring constant, followed by a change in the natural frequency of the pitch motion.

In the present invention, therefore, effective pitch control insusceptible to any changes in the gradient of the road surface becomes possible by incorporating changes in the magnitude of the traveling resistance equivalent torque over time into the correction function for the calculation of the torque correction value.

Additionally, the correction function is changed according to a particular change-over-time in the pitch quantity which is an amplification level of the pitch motion of the electric vehicle.

It has been discussed above that when rigidity of the suspension system is estimated, the magnitude of the road surface gradient is considered, and that the correction function is correspondingly changed. In the meantime, more precise control is possible by detecting the rigidity itself of the suspension system or the amplitude itself of the pitch vibration which changes according to the rigidity. Accordingly, the pitch control device according to the present invention features detecting the pitch quantity and changing the correction function.

The torque correction value is calculated from a difference between the actual pitch quantity which is the amplitude level of the pitch vibration, and a target pitch quantity calculated in advance from the acceleration of the electric vehicle, the vehicle weight, and the traveling resistance equivalent torque. Otherwise, the torque correction value is calculated from a difference between a time-differentiated value of the actual pitch quantity and that of the target pitch quantity.

A feed-forward-like method of correction for calculating the torque correction value using the correction function predefined in the torque correction value calculator has been discussed. This correction method, however, would be replaceable by a feedback-like method of correction, which includes calculating the torque correction value from the difference between the actual pitch quantity and the target pitch quantity or between the differentiated value of the actual pitch quantity and that of the target pitch quantity. This latter correction method allows the driving torque correction value to be appropriately corrected to suit a particular change in state quantities of the electric vehicle with time.

The pitch control device according to the present invention can also be applied to materials-handling electric vehicles.

Effects of the Invention

The electric-vehicle pitch control device according to the present invention effectively suppresses occurrence of the pitch motion, caused by the sway-back due to a nose dive, by preventing discontinuous negative acceleration from occurring at the moment of the electric vehicle stopping during braking. The pitch control device is also effective in that even if traveling resistance is significantly changed according to the particular gradient of the traveling road surface and other factors, the device always controls the braking torque appropriately, and in that the device enhances steering stability while ensuring riding comfort for passengers under various traveling conditions.

MODE FOR CARRYING OUT THE INVENTION

Hereunder, the best mode for carrying out the present invention will be described in accordance with an exemplary embodiment.

First, how a pitch motion of a vehicle occurs is described below using FIG. 2.

Figure 2:
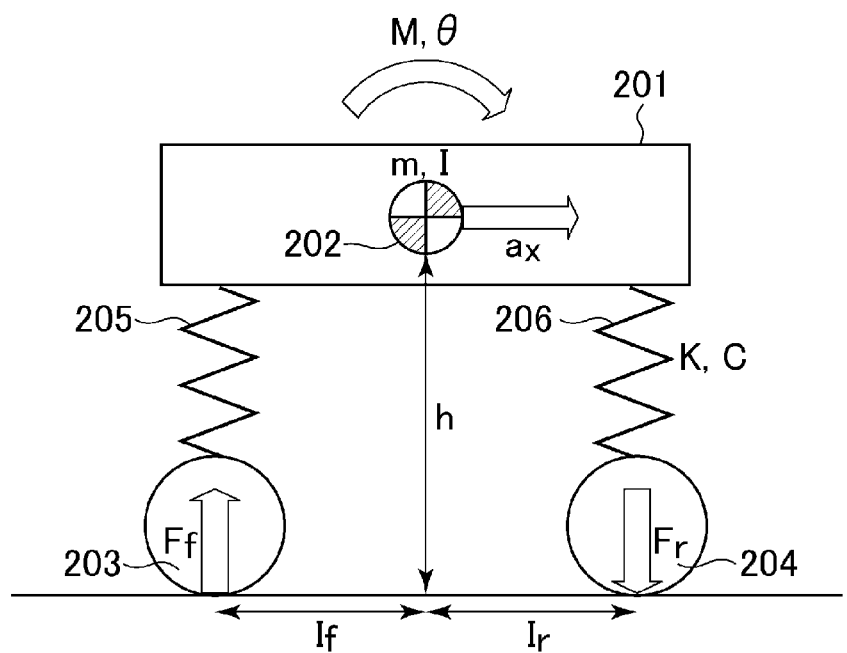
FIG. 2 is a diagram schematically showing a pitch motion of a vehicle.

FIG. 2 is a diagram schematically showing the pitch motion of a vehicle.

Referring to FIG. 2, the vehicle body 201 is supported and coupled to a wheel 203 and a rear wheel 204 via a suspension 205 and a rear suspension 206, respectively. Let a weight of the vehicle body 201 in FIG. 2 be expressed as "m", a moment of inertia in the pitch motion as "I", a moment of the pitch motion itself as "M", and a pitch quantity as "θ". Also, let rigidity of a suspension system against the pitch motion be expressed as "K", a damping quantity as "C", height of a center point of gravity, 202, of the vehicle body 201 above a road surface, as "h", and distances from the wheel 203 and rear wheel 204 to the center point of gravity in the horizontal direction, as "lf" and "lr", respectively.

Suppose that tires do not slip. An acceleration "ax" of the vehicle body 201 can be expressed as $$ax = Ta/mrt \qquad (1)$$

where "Ta" is a braking/driving torque that has been output from a driving motor 112, and "rt" is a tire diameter of the rear wheel 204 which is a driving wheel.

Consider here the amounts of load shift, "Ff" and "Fr", of the and rear wheels due to an accelerating motion of the vehicle.

A longitudinal accelerating motion of the center point of gravity, 202, that is present at the height of "h" above the ground is supporting the and rear wheels with respect to the ground surface at the longitudinal distances of "lf" and "lr".

Therefore, the amounts of load shift, "Ff" and "Fr", that are forces exerted upon the ground surface at that time, are expressed as follows if a downward shift is taken as plus:

$$Ff = -2axmh/(lf+lr) \qquad (2)$$

$$Fr = 2axmh/(lf+lr) \qquad (3)$$

The moment M about the center point of gravity, due to the load shifts, can be expressed as follows if a clockwise direction is taken as plus in FIG. 2:

$$M = -Fflf + Frlr \qquad (4)$$

Substituting above expressions (2) and (3) into expression (4) gives the following as the moment M about the center point of gravity:

$$M = 2mh \cdot ax \qquad (5)$$

If a static balance of forces is considered, the amount of pitch, θS at this time can be expressed as follows:

$$\theta S = M/K = (2mh/K)ax \quad (6)$$

Meanwhile, a transfer function of the dynamic pitch motion of the vehicle body 201 due to the moment M about the center point of gravity is expressed as:

$$\theta(s)/M(s) = 1/(Is^2 + Cs + K) \quad (7)$$

The amount of pitch that allows for up to dynamic characteristics of the suspension system can be expressed as follows by substituting expression (5) into expression (7):

$$\theta(s) = 2mh/(Is^2 + Cs + K) \cdot ax(s) \quad (8)$$

Figure 3:
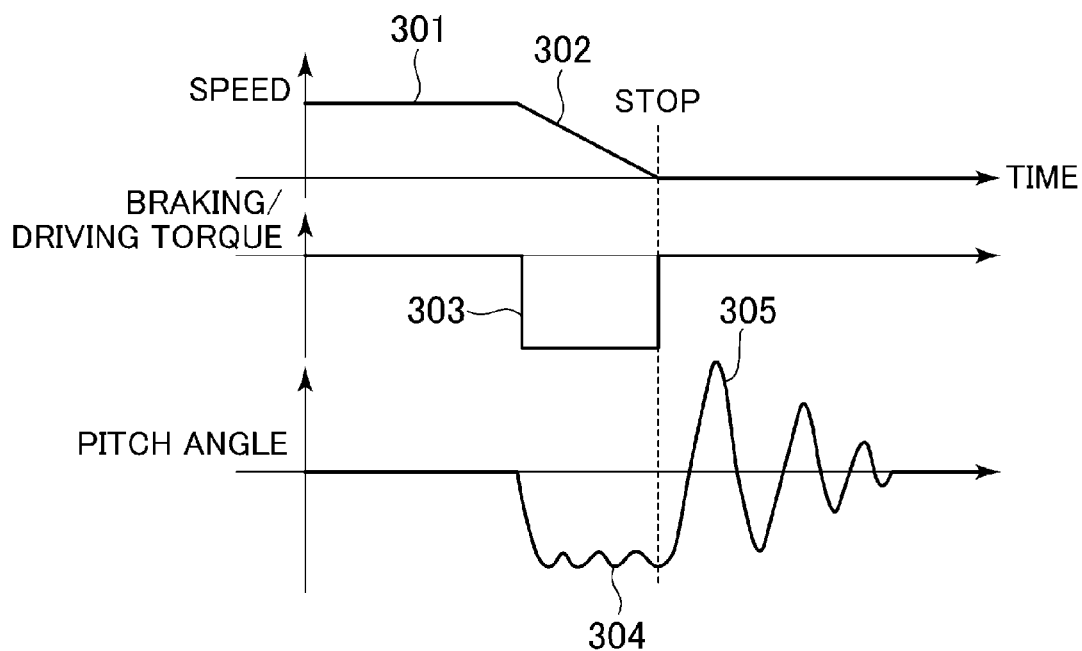
FIG. 3 is a diagram that schematically represents how input/output signals to/from the electric-vehicle pitch control device according to the present invention change in state when the control device does not conduct correction control.

FIG. 3 is a time-series representation of changes in a response waveform of the pitch motion expressed by vehicle speed, braking/driving torque, and pitch angle signals when the vehicle running across a flat ground surface at a constant speed comes to a sudden stop from a certain time at a constant braking torque.

Changes in vehicle speed are denoted as 301, 302, those of the braking/driving torque as 303, and those of the pitch response as 304, 305. Plus values of the braking/driving torque denote a driving torque, minus values denote a braking torque, and zero denotes that neither a braking nor driving torque is occurring.

When the constant braking torque denoted as 303 is applied to the driving wheels, the vehicle speed 301 decreases to the speed 302 at a fixed rate and the vehicle stops. During the period in which the constant braking torque is applied, the pitch motion continues to decline to the quantity represented by expression (6), and as a result, the vehicle leans forward, entering into a nose-dive state. The nose dive, or the state in which the suspension on the wheel contracts by reason of a rotational moment of the vehicle body due to deceleration and the vehicle leans forward, means that energy remains stored within the spring, and this state persists until the vehicle has come to a stop.

Next, when the vehicle that is about to stop enters a state in which the negative acceleration due to the braking torque upon the vehicle suddenly becomes zero, the energy of the spring due to the nose dive is released in bursts, causing free vibration of the spring, as denoted by 305. This vibration is equal to the step response in the transfer function of expression (8), and is the pitch motion associated with the sudden stop. Since the numerical expressions herein described do not include an influence of the moment exerted upon a suspension arm by driving repulsion, the influence caused by the driving repulsion also requires consideration during actual control. Magnitude of the influence significantly differs according to the type of suspension system, so description of the magnitude is omitted herein.

Figure 1:
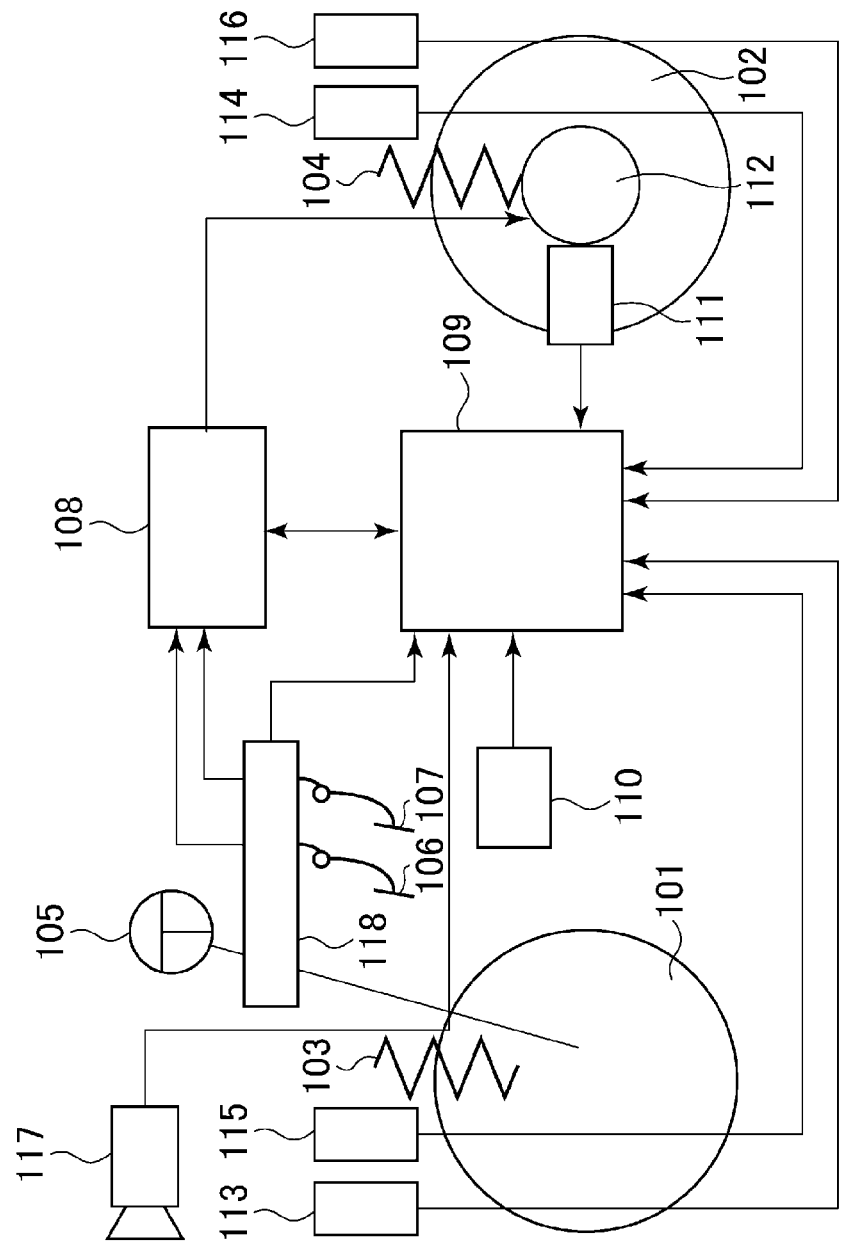
FIG. 1 is a total configuration diagram of an electric-vehicle pitch control device according to an embodiment of the present invention.

FIG. 1 is a total configuration diagram of an electric-vehicle pitch control device according to an embodiment of the present invention.

An electric vehicle applying the present invention travels by means of wheels 101 and rear wheels 102.

The wheels 101 and the rear wheels 102 are mounted so that each can be oscillated vertically with respect to the vehicle body via a suspension 103 or 104. A steering wheel 105 is connected to the wheels 101, enabling a driver to perform turning and traveling operations by steering the vehicle.

A driving motor 112 is mechanically connected to each of the rear wheels 102.

An accelerator pedal 106 and a brake pedal 107 are an operating section for inputting an acceleration request and deceleration request of the driver, and these request output signals are input to a drive unit 108.

The drive unit 108 calculates a necessary braking/driving torque based upon the driver's acceleration/deceleration request generated when the pedals are operated, and outputs the calculated torque as a braking/driving torque command value to each driving motor 112.

The driving motor 112 drives and brakes the wheel in response to the received braking/driving torque command value.

Traveling resistance calculation means 110 calculates a traveling resistance equivalent torque that is a value obtained by converting a force to be applied to the electric vehicle to maintain its stopped condition with respect to a sloped road surface, into the braking/driving torque. The traveling resistance equivalent torque is resistance force working upon the electric vehicle while the vehicle is in contact with the road surface. For example, when a vehicle traveling forward on an upslope comes to a stop, a force that acts as if it were to pull the vehicle backward occurs, so a counteracting force balancing that force needs to be applied to the vehicle before it can stop on the upslope. The traveling resistance equivalent torque at this time becomes a driving torque, which takes a plus value. Conversely, when a vehicle traveling forward on a downslope comes to a stop, a force that acts as if it were to pull the vehicle forward occurs, so a counteracting force balancing that force needs to be applied to the vehicle before it can stop on the downslope. The traveling resistance equivalent torque at this time becomes a braking torque, which takes a minus value. On a road surface with substantially no gradient, it is unnecessary to generate a braking/driving torque during the vehicle stop, so this torque is considered to take a value of zero.

In the present invention, the braking/driving torque command value that is output to the driving motor when the vehicle stops is controlled to be the traveling resistance equivalent torque calculated by the traveling resistance calculation means 110.

Speed detection means 111, connected to each rear wheel 102 or each driving motor 112, detects a speed of the vehicle by measuring a rotating speed of the rear wheel 102. In order to implement the above control, the detected vehicle speed and the traveling resistance equivalent torque calculated by the traveling resistance calculation means 110 are input to a torque correction value calculator 109, which then calculates a torque correction value based upon input values of the vehicle speed and the traveling resistance equivalent torque.

The thus-calculated torque correction value is input to the drive unit 108 and used for additive correction of the braking/driving torque calculated in accordance with the acceleration/deceleration request generated by the pedal operations of the driver.

By conducting the above control, the control device obtains the traveling resistance equivalent torque as the braking/driving torque command value which is output to the driving motor when the vehicle stops. Immediately before the vehicle stops, therefore, the suspension is returned to its neutral position, whereby the pitch motion during a sudden stop of the vehicle is appropriately controlled and even on a sloped road surface, in particular, reliable and highly precise control insusceptible to the traveling resistance is achieved.

The traveling resistance equivalent torque, calculated by the traveling resistance calculation means 110, is calculated from a difference between the braking/driving torque calculated in the drive unit 108 in accordance with the electric vehicle acceleration/deceleration request dictated by the amounts of driver's pedal operations (in other words, the braking/driving torque command value output from the drive unit 108 to the driving motor 112), and a vehicle body inertial equivalent torque obtained from a time-differentiated value of the vehicle speed detected by the speed detection means 111. For an electrically driven type of vehicle, torque of a motor can be detected from a supplied current value very accurately and this value can be used as a replacement for the braking/driving torque calculated by the drive unit 108. The speed detection means 111, connected to the rear wheel 102 or the driving motor 112, detects the vehicle speed by measuring the rotating speed of the rear wheel 102. The traveling resistance equivalent torque can be determined by subtracting the torque that has been required for actual acceleration of the vehicle, from the torque output by the motor. This enables the traveling resistance equivalent torque to be calculated without adding a sensor, and the control device to be correspondingly reduced in cost.

Next, a main process flow of the control in the electric-vehicle pitch control device according to the present invention is described below using FIG. 4.

As described earlier herein, the pitch motion during a sudden stop is mainly caused by the free vibration of springs that occurs when the energy stored in the suspension during a nose dive is released in bursts. Before the vehicle stops, therefore, the suspension during the nose dive needs to be returned to the neutral position so that the springs do not cause the free vibration.

Immediately before the vehicle stops, the electric-vehicle pitch control device according to the present invention reduces the braking/driving torque smoothly, thus suppresses abrupt changes in acceleration, and hence reduces the pitch motion.

Figure 4:
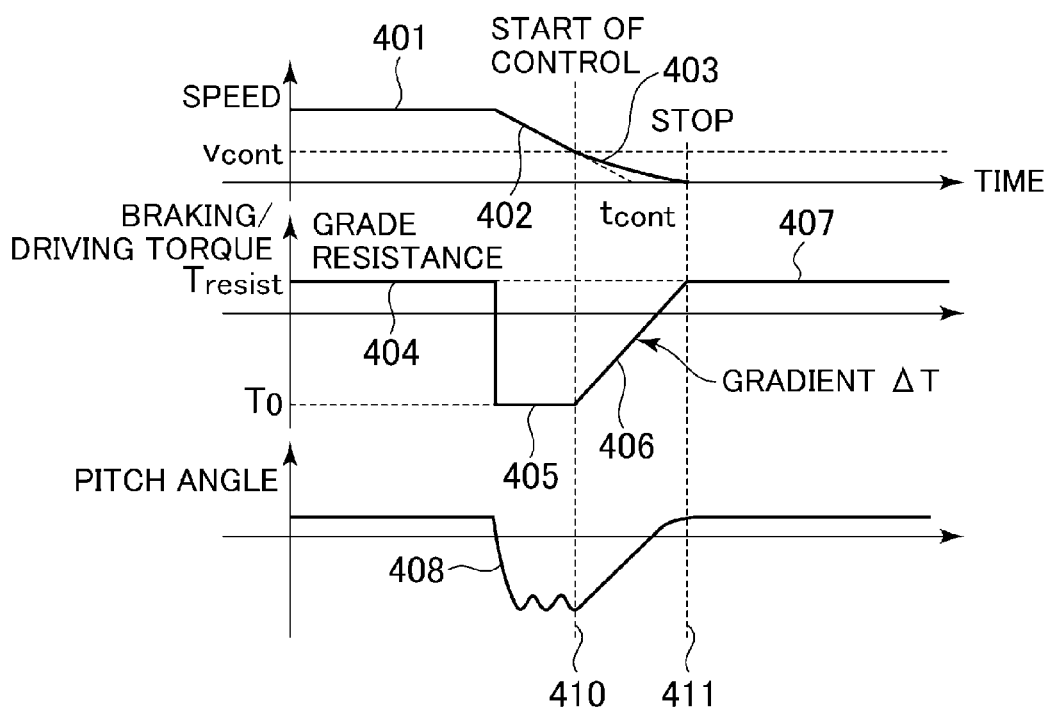
FIG. 4 is a diagram that schematically represents input/output signals to/from the electric-vehicle pitch control device according to the present invention.

A more specific response waveform of the then pitch motion is shown in FIG. 4.

FIG. 4 shows an example of control on a traveling road surface with an ascending slope.

Changes in vehicle speed are denoted as 401 to 403, changes in the braking/driving torque upon the vehicle are denoted as 404 to 407, and a change in pitch response is denoted as 408. Timing in which the control is initiated is denoted as 410, and timing in which the control is completed and the vehicle stops is denoted as 411. The description here assumes that in order to travel up an ascending-sloped road at a constant speed denoted as 401, the driver continues to step on the accelerator pedal 106 and output the driving torque 404 equivalent to the traveling resistance equivalent torque.

When the constant braking torque denoted as 405 is applied to driving wheels by the driver's operation of the brake pedal 107, the vehicle speed 401 decreases to the speed 402 at a fixed rate in a pattern similar to that described in connection with the pitch motion of a vehicle not equipped with the pitch control device of the present invention. During the period in which the constant braking torque is applied, the pitch motion continues to decline to a quantity corresponding to the negative acceleration, and as a result, the vehicle leans forward, entering into a nose-dive state.

At this time, if the braking/driving torque 406 is controlled to be the traveling resistance equivalent torque in the timing 411 that the vehicle speed becomes zero and the vehicle stops, magnitude of the pitch motion is also returned to the level existing when the suspension is in the neutral position. This return prevents sway-back vibration from occurring after the vehicle stop.

Effective control of the pitch motion can therefore be conducted by calculating the torque correction value from the control initiation timing 410 by use of the torque correction value calculator 109, correcting the braking/driving torque calculated in accordance with the driver's acceleration request and deceleration request, and controlling the braking/driving torque command value to become the traveling resistance equivalent torque when the electric vehicle stops.

Since the braking/driving torque is thus controlled, the magnitude of the pitch motion also decreases accordingly. In addition, the vehicle speed asymptotically approaches zero over time, as with the speed 403, until the vehicle has stopped.

If the braking/driving torque command value during the vehicle stop is not in agreement with the traveling resistance equivalent torque, the vehicle, even after the vehicle speed has reached zero, accelerates or slides down the slope, causing discontinuity of the acceleration. Thus, sway-back vibration is occurred.

When control in a second embodiment described later herein is started, the traveling resistance equivalent torque in the present embodiment is also applied as the traveling resistance equivalent torque with respect to a sloped road surface along which an electric vehicle is traveling.

As described above, the present invention uses the torque correction value calculator 109 to calculate the torque correction value based on the traveling resistance equivalent torque calculated by the traveling resistance calculation means 110, and uses the drive unit 108 to correct the braking/driving torque in accordance with the torque correction value and output the corrected torque as the braking/driving torque command value to the driving motor 112. Thus, immediately before the vehicle stops, the suspension is returned to the neutral position, whereby the pitch motion during a sudden stop of the vehicle is appropriately controlled and even on a sloped road surface, in particular, reliable and highly precise control insusceptible to the traveling resistance can be achieved.

Next, the second embodiment of the present invention is described below.

While a detailed method of calculating the torque correction value has not been described in the first embodiment, the second embodiment assumes that the driving torque is corrected in accordance with a correction function "f(t)" assigned as a torque correction value "Trev" in advance.

For simplicity in the description here, linear correction using a linear function equivalent to the braking/driving torque change 406 shown in FIG. 4 is taken as an example.

Figure 5:
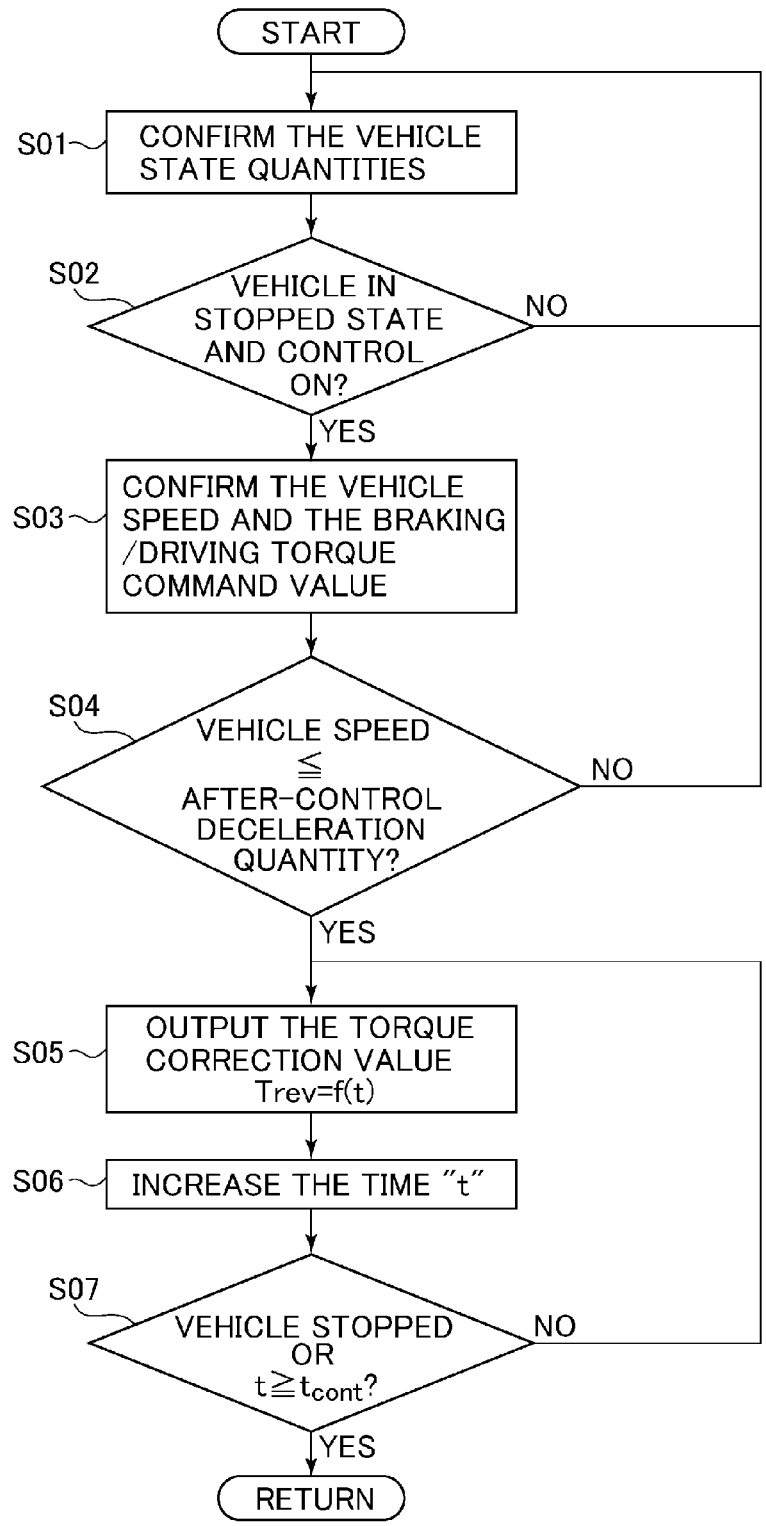
FIG. 5 is a diagram showing a flow of processing in the electric-vehicle pitch control device according to the present invention.

FIG. 5 is a diagram showing a flow of processing in an electric-vehicle pitch control device according to the second embodiment of the present invention.

As shown in FIG. 5, the torque correction value calculator 109 first confirms the vehicle state quantities in step S01. The vehicle state quantities are, for example, the amount of operation of the brake pedal 107 by the driver, the vehicle speed measured by the speed detection means 111, and the braking/driving torque command value output to the driving motor 112.

Next, whether the vehicle is in a state existing immediately before the vehicle stops, and whether the vehicle is in a state that requires pitch control are determined in step S02.

If the vehicle state is determined not to satisfy these control conditions, the process returns to step S01. If the vehicle state is determined to satisfy the control conditions, the process advances to step S03.

The vehicle speed v measured by the speed detection means 111, and the braking/driving torque command value T output from the drive unit 108 to the driving motor 112 are confirmed in step S03.

Next, whether the initiation timing of control has been reached is determined in step S04.

If the initiation timing of control is determined to have been reached, the process advances to step S05.

If the initiation timing of control is determined not to have been reached, the process returns to step S01, for reconfirmation of the vehicle state.

A more detailed method of determining in step S04 whether the initiation timing of control has been reached is described below.

A correction with an initial braking/driving torque command value T0 output to the driving motor 102 during a start of the determination is conducted in accordance with the correction function "f(t)" so that the traveling resistance equivalent torque finally becomes a traveling resistance equivalent torque "Tresist". The negative acceleration of the vehicle that is obtained by this correction is integrated. The negative acceleration can be determined by dividing the deceleration torque by tire radius "rt" and vehicle weight "m".

That is to say, the amount of deceleration after a start of control, or $$v\text{cont} = \int \{(T0 + f(t) - T\text{resist})/rt/m\} dt \quad (9)$$

is calculated and this value is compared with a current vehicle speed v measured by the speed detection means 111.

If v≤vcont at this time, the final vehicle speed based on the braking/driving torque correction is determined to become zero, that is, the vehicle is determined to come to a stop, and the control is started.

For example, if as in FIG. 4, the braking/driving torque value is to be corrected linearly, that is, in accordance with the linear function, the linear function "f(t)" can be expressed as follows:

$$T\text{rev}(t) = \Delta T \cdot t \quad (10)$$

where ΔT is a gradient of the linear function.

If this correction is to be conducted for a period of "tcont", defining the traveling resistance equivalent torque as "Tresist" makes it necessary that the following relationship be established:

$$\Delta T \cdot t\text{cont} = T0 + T\text{resist} \quad (11)$$

An integral of expression (9) becomes $$v\text{cont} = (T0 + T\text{resist})2/(2 \cdot m \cdot rt \cdot \Delta T) \quad (12)$$

in an interval from 0 to "tcont", so the vehicle speed at which the control is to be started can be calculated in accordance with expression (9).

If the appropriate initiation timing of the control is thus determined, the torque correction value "Trev" is output to the drive unit 108 in step S05.

Here if "t=0" at the control initiation timing, the torque correction value "Trev" is expressed as $$T\text{rev} = f(t) \quad (13)$$

and in a case of the correction with the linear function described above, the correction value expressed as $$T\text{rev} = \Delta T \cdot t \quad (14)$$

is output to the drive unit 108.

In step S06, the time "t" is increased by a cycle time of the control, and in step S07, if the control period has terminated, for example "t≥tcont", or if the vehicle has come to a stop, this loop is exited to complete the process.

As described above, in the present invention, the braking/driving torque can be corrected in accordance with the correction function preassigned as the torque correction value.

Although the linear function has been shown as an example in the description, pitch can likewise be controlled by, for example, using a previously created optimal correction curve based on motion dynamics of the suspension. In addition, the control preferably uses such a function that the braking/driving torque command value output to the driving motor during the stop of the vehicle asymptotically becomes the traveling resistance equivalent torque. Furthermore, in addition to being low enough in comparison with frequency characteristics of the drive unit 108 and the driving motor 112, a change rate of the correction function is preferably lower than frequency characteristics of the pitch motion of the vehicle body, caused by changes in torque, and the changes in the correction function are preferably as smooth as possible in a range that an influence of extension of a stopping distance is admissible. High performance and high reliability of the control device can be realized by controlling the braking/driving torque using such a correction function.

The traveling resistance equivalent torque calculated by the traveling resistance calculation means 110, therefore, is used as a control target value in the torque correction value calculator 109, and similarly, the vehicle speed detected by the speed detection means 111 is input to the torque correction value calculator 109 and used as data for determining the control initiation timing 410. Thus, pitch can be controlled so that the braking/driving torque command value output to the driving motor 112 becomes the traveling resistance equivalent torque.

Next, a third embodiment of the present invention is described below.

General vehicles use nonlinear springs on respective suspension systems to achieve compatibility between riding comfort and steering stability. In a case of these vehicles, rigidity K of the suspension system in expression (8), for example, generally becomes a function of the vehicle weight "m". That is to say, a change in the vehicle weight "m" also causes a nonlinear change in the amount of deflection of the suspension system, and hence a change in pitch rigidity as well, with the result that a natural frequency of the pitch motion also changes.

Additionally, as the number of passengers and/or the weight of the load changes, a gravitational position of the vehicle body also changes, which in turn varies the gravitational height "h" significantly with the change in the amount of deflection of the suspension system.

Thus, a control system design of the pitch control device needs to be conducted in consideration of such volumetric changes and the gradient of the road surface.

The present invention includes vehicle weight determination means 113 and 114, which are provided near the wheels 101 and the rear wheels 102. The vehicle weight determination means 113 and 114 calculate the vehicle weight by multiplying, by a known suspension spring constant, a displacement of each suspension that has been detected using an element such as a stroke sensor of the suspension 103 or 104. The vehicle weight determination means 113, 114 also calculate each wheel load using a pressure sensor mounted in/on the hydraulic suspension, totalize the calculated wheel loads and the foregoing vehicle weight, and thus determine a total vehicle weight that includes passengers, a carrying load, and the like. Instead of this method, weight determination may be done by, for example, measuring a clearance between the vehicle body and the ground surface, or using strain sensors mounted at a load-indicating section of the vehicle body and that of the suspension. That is to say, a method of the weight determination is not limited.

On the basis of the vehicle weight information thus obtained by the vehicle weight determination means, necessary changes and adjustments are conducted upon the correction function "f(t)" described in the second embodiment. This allows the appropriate driving torque correction value to be calculated, even when the vehicle changes in weight.

More specifically, as can be seen from the transfer function in expression (8), the natural frequency of the pitch motion is proportional to the inertial moment of the vehicle body and varies inversely as pitch rigidity, the change in vehicle weight must be appropriately incorporated into the control device before effective pitch control can be implemented.

Accordingly, over-time variations in the correction function "f(t)" described in the second embodiment are adjusted according to the particular natural frequency.

If the correction function "f(t)" is intended for linear correction with a linear function, the gradient $\Delta T$ of the linear function in expression (10) is increased or reduced according to the particular natural frequency of the pitch motion.

For example, this would be done by calculating a relationship between the vehicle weight and the natural frequency of the pitch motion beforehand and then if the natural frequency corresponding to the determined vehicle weight is too high, increasing $\Delta T$ by reason of the change in pitch motion being regarded as too steep. Conversely if the natural frequency is too low, reducing $\Delta T$ by reason of the change in pitch motion being regarded as too smooth, thereby to make the correction function more smooth.

For correction using a more complex correction function or table, assigning "t'=$\Delta t \cdot t$" instead of the correction function "f(t)" allows a change in correction function to be appropriately controlled. For example, if the natural frequency is too high, the change in correction function can be made faster by increasing $\Delta t$ above 1, or if the natural frequency is too low, the change in correction function can be made slower by reducing $\Delta t$ below 1.

A flow of processing in the present embodiment is described below using FIG. 5. As in the second embodiment, the vehicle weight that was determined by the vehicle weight determination means using the foregoing determining method is confirmed in vehicle state quantity confirmation step S01, and the functions for correction function computing in steps S04 and S05 are adjusted using the confirmed vehicle weight.

In this way, the electric-vehicle pitch control device of the present invention uses the vehicle weight determination means to incorporate the natural frequency of the pitch motion due to the change in vehicle weight, into control, thereby implementing reliable and highly precise control insusceptible to loading states, particularly of a truck or other vehicles whose weights significantly change with a change in a weight of the load. The present invention is therefore suitable for transport units and devices.

Next, a fourth embodiment of the present invention is described below.

In the present embodiment, necessary changes and adjustments based on the magnitude of the traveling resistance equivalent torque are conducted upon the correction function "f(t)". This allows the appropriate driving torque correction value to be calculated, even when the gradient of the road surface changes during vehicle traveling.

A change in the gradient of the road surface on which the vehicle is placed changes a longitudinal weight distribution of the vehicle. If the springs of the suspensions have nonlinearity, the spring constants of the and rear suspensions change and pitch rigidity also changes.

Thus, as detailed earlier herein, since the natural frequency of the pitch motion also changes in inverse proportion to pitch rigidity, the change in road surface gradient must be appropriately reflected in the control device before effective control of pitch can be realized.

As described in the above embodiments, therefore, the magnitude of the over-time variations in the correction function "f(t)" is adjusted according to the particular natural frequency. For example, this would be done by calculating a relationship between the traveling resistance equivalent torque and the natural frequency of the pitch motion beforehand and then if the natural frequency corresponding to the calculated traveling resistance equivalent torque is too high, increasing a change rate of the correction function "f(t)" by reason of the change in pitch motion being regarded as too steep.

Conversely if the natural frequency is too low, the change rate of the correction function "f(t)" would be reduced by reason of the change in pitch motion being regarded as too smooth.

In this way, the electric-vehicle pitch control device of the present invention incorporates the traveling resistance equivalent torque calculated using the traveling resistance calculation means, that is, the change in road surface gradient, into control, thereby allowing the invention to maintain suitable control performance even on sloped road surfaces.

Next, a fifth embodiment of the present invention is described below.

The concept of estimating the pitch rigidity of the suspensions according to the magnitude of the road surface gradient expressed in terms of traveling resistance equivalent torque and incorporating the estimated value into control has been shown and described in the foregoing embodiment.

Even more precise control can however be achieved by detecting suspension rigidity or the amplitude itself of the pitch vibration that changes with suspension rigidity.

Accordingly, an idea of changing the correction function "f(t)" in accordance with the pitch quantity obtained by pitch quantity detection means 115, 116 by detecting the magnitude of the pitch of the suspensions, is described below in the fifth embodiment.

Since the pitch motion is caused by the longitudinal acceleration/deceleration of the vehicle body, a pitch response gain obtained by dividing the pitch quantity by the vehicle acceleration can be determined by calculating the vehicle acceleration from the time-differentiated values of the vehicle speed measured by the speed detection means 111.

The pitch response gain is a coefficient of "ax" on a right side of expression (6), and varies inversely as pitch rigidity, so an increase in the pitch response gain is estimated to reduce the natural frequency of the pitch vibration, resulting in a slow change.

Accordingly, if the correction using the pitch response gain makes the gain too large, the change may be controlled for a lower change rate of the correction function "f(t)".

This allows the correction function to be modified from pitch rigidity as appropriate, making the control device even more precise.

Next, a sixth embodiment of the present invention is described below.

The concept of using a predefined correction function to correct the driving torque in a feed-forward-like fashion has been described in the embodiments.

The present embodiment, on the other hand, calculates a target pitch quantity for predicting the pitch state quantities of the electric vehicle. For example, this calculation is based on the traveling resistance equivalent torque in the traveling resistance calculation means 110 for calculating the traveling resistance equivalent torque including the gradient of the road surface, on the vehicle acceleration that is the time-differentiated value of the vehicle speed detected by the speed detection means 111, and on the weight of the vehicle.

This calculation may use a so-called feedback-like correcting method, in which the torque correction value is determined from a difference between the target value and the pitch quantity that is the magnitude of the amplitude of the actual pitch vibration detected by the pitch quantity detection means 115 and 116.

The calculation may be based on alternative feedback-like correction using the difference between pitch speeds that are the time-differentiated values of the above state quantities.

Further alternatively, disturbance-caused errors may be compensated for using a feedback-like correction method combined with feed-forward-like control based on the above-described correction function.

This allows the driving torque correction to be appropriately adjusted according to a particular actual situation, imparting robustness to the control device.

Next, a seventh embodiment of the present invention is described below.

The pitch control device of the present invention corrects the braking/driving torque existing immediately before the vehicle stops. Depending upon the kind and details of the correction, therefore, the stopping distance may be longer, albeit only slight.

Under a situation that requires an emergency stop, however, the correction of the braking/driving torque may be canceled with priority assigned to a reliable vehicle stop over the suppression of vibration, in order to avoid the emergency stop.

For this reason, when driver's operating quantity detection means 118 mounted in/on the steering wheel 105, the accelerator pedal 106, and the brake pedal 107, detects the driver's operations, emergency avoidance manipulation occurs if a steering angle and rate of the steering wheel are greater than respective presettings.

In a case that the amounts and rates of pedal operations exceed their presettings and abrupt braking is detected, the correction of the braking/driving torque is canceled since the driver is determined to have taken an emergency avoidance action.

Alternatively, forward obstacle detection means 117 may detect forward obstacles. The forward obstacle detection means 117 in this case would detect forward obstacles by, for example, using a camera or emitting laser light, millimetric waves, ultrasonic waves, or the like, in a forward direction and detecting reflected waves thereof.

If an obstacle is detected in the forward direction of the vehicle, the control device determines emergency braking to be necessary and cancels the correction of the braking/driving torque.

This maximizes the braking torque for shorter braking distance, suppressing an influence of control upon the emergency braking action, and improving safety of the control device.

Next, an eighth embodiment of the present invention is described below.

In electric vehicles for materials handling, such as dump trucks, a regenerative torque used to decelerate the vehicle is small relative to the vehicle weight and the brake pedal is usually operated to its maximum to stop the vehicle.

If the maximum amount of operation of the brake pedal 107 is thus continually maintained, therefore, it can be determined that a braking operation for stopping the vehicle has been performed, and hence that the operation is not just a minor or slight braking operation intended for speed control.

In the present embodiment, therefore, as in the above embodiment, the driver's operating quantity detection means 118 mounted in/on the brake pedal 107 detects the driver's brake pedal operation.

If it is continually detected for at least a previously set time that the amount of brake pedal operation is the maximum amount of operation thereof, the control device determines the vehicle stop to have been requested and executes the correction of the braking/driving torque.

This allows separation between speed control and the vehicle-stopping situation, thus improving operability of the control device.

Next, a ninth embodiment of the present invention is described below.

Brake pedal operations to stop the vehicle are conducted in such a way as to first obtain a desired negative acceleration of the vehicle, and immediately before the vehicle stops, the driver usually operates the pedal to empirically suppress the pitch vibration by somewhat reducing the stepping pressure on the pedal.

For a larger-size electric vehicle for materials handling, however, subtle operations by humans are difficult and pitch vibration easily occurs.

Accordingly, immediately before the vehicle stops, when a decrease in the amount of operation of the brake pedal 107 is detected, it can be determined that the driver has a request to suppress pitch vibration.

In the present embodiment, therefore, as in the above embodiment, the driver's operating quantity detection means 118 mounted in/on the brake pedal 107 detects the driver's brake pedal operation.

If a decrease in the amount of brake pedal operation at a speed lower than a previously set speed is detected, the control device determines the driver to have requested the suppression of pitch vibration during the vehicle stop and executes the correction of the braking/driving torque.

Without requiring a high level of skill of the driver, this correction enables the control device to suppress pitch vibration when the driver is in need of pitch suppression. The correction also improves the operability of the control device.

Next, a tenth embodiment of the present invention is described below.

When a driver of a materials-handling electric vehicle such as a dump truck wishes to stop the vehicle for loading or other purposes, the driver may need to adjust the stopping position while driving the vehicle forward at a very low speed and confirming a current position of the vehicle, and strongly step on the brake pedal at the stopping position.

In such a case, since the vehicle is traveling at low speeds and hence since the amount of pitch vibration occurring is also small, obtaining a maximum braking force by suppressing the correction of the braking/driving torque is estimated to improve operability.

In the present embodiment, therefore, the vehicle speed detection means 111 detects and monitors the speed of the vehicle and when the brake pedal is operated at a speed below the previously set speed, the control device determines the vehicle to be traveling for the adjustment of the stopping position and suppresses the correction of the braking/driving torque.

This allows suppression of a situation in which the braking torque might be unnecessarily reduced despite the driver's request for an immediate stop, such as when conducting fine adjustments on the stopping position of the vehicle. Therefore, the operability of the control device can be improved.

While the best mode for carrying out the present invention has been described above in accordance with embodiments, a more specific configuration of the invention is not limited to/by the embodiments and any design changes or modifications staying within the scope of the invention are embraced therein.

DESCRIPTION OF REFERENCE NUMBERS

101, 203 wheels
102, 204 Rear wheels
103, 104, 205, 206 Suspensions
105 Steering wheel
106 Accelerator pedal
107 Brake pedal
108 Drive unit
109 Torque correction value calculator
110 Traveling resistance calculation means
111 Speed detection means
112 Driving motor
113, 114 Vehicle weight determination means
115, 116 Pitch quantity detection means
117 Forward obstacle detection means
118 Driver's operating quantity detection means
201 Vehicle body
202 Center point of gravity
301, 302 Vehicle speeds
303, 404 to 407 Braking/driving torques
304, 305, 408 to 411 Pitch responses
401 to 403 Vehicle speeds

The invention claimed is:

1. A pitch control device for an electric vehicle, configured to conduct control for suppressing a change in an attitude of the electric vehicle due to a pitch motion thereof while the electric vehicle is accelerating/decelerating by a driving motor, the pitch control device comprising:

a drive unit that calculates a braking/driving torque based upon a request for an acceleration/deceleration of the electric vehicle and outputs the calculated braking/driving torque as a braking/driving torque command value to the driving motor; and a torque correction value calculator that calculates a torque correction value for the braking/driving torque so that the braking/driving torque command value will be a traveling resistance equivalent torque that is a value obtained when a force needed to stop the electric vehicle on a sloped road surface and maintain the electric vehicle in a stopped condition is converted into a torque of the driving motor;

wherein the drive unit corrects the braking/driving torque in accordance with the torque correction value calculated in the torque correction value calculator, and outputs the corrected torque as the braking/driving torque command value to the driving motor;

wherein assuming that the braking/driving torque is corrected and that the corrected braking/driving torque is output as the braking/driving torque command value to the driving motor, the pitch control device calculates a time-integrated value of a negative acceleration of the electric vehicle, then when the time-integrated value of the negative acceleration agrees with a speed of the electric vehicle, the pitch control device enables the correction of the braking/driving torque, and outputs a corrected value thereof as the braking/driving torque command value to the driving motor.

2. The electric-vehicle pitch control device according to claim 1, wherein the traveling resistance equivalent torque is determined from a difference between the braking/driving torque calculated in accordance with the electric vehicle acceleration/deceleration request dictated by driver's pedal-operating quantities, and a vehicle body inertia-equivalent torque calculated from a time-differentiated value of a speed of the electric vehicle.

3. The electric-vehicle pitch control device according to claim 1, wherein the torque correction value calculator has a correction function for calculating the torque correction value, and calculates the torque correction value in accordance with the correction function so that when the electric vehicle stops, the braking/driving torque command value becomes the traveling resistance equivalent torque.

4. The electric-vehicle pitch control device according to claim 3, wherein the correction function is changed according to a particular change in magnitude of a weight of the electric vehicle over time.

5. The electric-vehicle pitch control device according to claim 3, wherein the correction function is changed according to a particular change in magnitude of the traveling resistance equivalent torque over time.

6. The electric-vehicle pitch control device according to claim 3, wherein the correction function is changed according to a particular over-time change in a pitch quantity which is a magnitude of amplitude of the pitch motion of the electric vehicle.

7. The electric-vehicle pitch control device according to claim 1, wherein the torque correction value is calculated from a difference between a pitch quantity that is a magnitude of amplitude of pitch vibration, and a target pitch quantity calculated from an acceleration of the electric vehicle, a weight thereof, and the traveling resistance equivalent torque, or is calculated from a difference between a time-differentiated value of the pitch quantity and that of the target pitch quantity.

* * * * *